United States Patent
Warwick, IV

(10) Patent No.: US 11,808,039 B1
(45) Date of Patent: Nov. 7, 2023

(54) STRUCTURAL INSULATED PANEL

(71) Applicant: William W. Warwick, IV, Virginia Beach, VA (US)

(72) Inventor: William W. Warwick, IV, Virginia Beach, VA (US)

(*) Notice: Subject to any disclaimer, the term of this patent is extended or adjusted under 35 U.S.C. 154(b) by 0 days.

(21) Appl. No.: 17/496,837

(22) Filed: Oct. 8, 2021

Related U.S. Application Data

(60) Provisional application No. 63/089,565, filed on Oct. 9, 2020.

(51) Int. Cl.
| | | |
|---|---|---|
| *E04C 3/36* | (2006.01) | |
| *E04C 2/24* | (2006.01) | |
| *E04C 2/36* | (2006.01) | |
| *E04C 2/38* | (2006.01) | |
| *B32B 15/085* | (2006.01) | |
| *B32B 3/12* | (2006.01) | |
| *B32B 37/10* | (2006.01) | |
| *B32B 37/14* | (2006.01) | |

(52) U.S. Cl.
CPC ............... *E04C 2/243* (2013.01); *B32B 3/12* (2013.01); *B32B 15/085* (2013.01); *B32B 37/1018* (2013.01); *B32B 37/142* (2013.01); *E04C 2/365* (2013.01); *E04C 2/38* (2013.01); *B32B 2262/108* (2013.01); *B32B 2307/304* (2013.01); *B32B 2607/00* (2013.01)

(58) Field of Classification Search
CPC .................................... E04C 2/36; B32B 3/12
See application file for complete search history.

(56) References Cited

U.S. PATENT DOCUMENTS

| | | | | |
|---|---|---|---|---|
| 4,530,417 | A | | 7/1985 | Daniel |
| 4,879,066 | A | * | 11/1989 | Crompton ............... C08K 3/016 106/18.21 |
| 5,589,016 | A | * | 12/1996 | Hoopingarner ........... B32B 5/22 428/116 |
| 5,738,924 | A | | 4/1998 | Sing |

(Continued)

FOREIGN PATENT DOCUMENTS

| | | |
|---|---|---|
| DE | 102004010939 A1 | 11/2005 |
| DE | 202006009620 U1 | 10/2006 |

(Continued)

OTHER PUBLICATIONS

English language translation of KR 20100119939 A generated on Nov. 17, 22 with KIPRIS website; paragraph numbers added by examiner.*

(Continued)

*Primary Examiner* — Mark Ruthkosky
*Assistant Examiner* — Julia L Rummel
(74) *Attorney, Agent, or Firm* — Thomas M. Joseph, Esq.

(57) ABSTRACT

A bridging element is positioned between a pair of insulating outer layers and a pair of rigid supporting inner layers. The bridging element includes a plurality of spaced-apart ribs supporting the rigid inner layers in a spaced-apart overlying relationship with a flexible sealing layer surrounding the plurality of spaced-apart ribs to form a first sleeve and another flexible sealing layer surrounding the supporting inner layers to form a second sleeve. The pair of insulating outer layers includes a composite assembly formed from non-metallic fibers and a thermal insulating material matrix.

14 Claims, 7 Drawing Sheets

(56) References Cited

U.S. PATENT DOCUMENTS

| | | |
|---|---|---|
| 8,196,701 B1 | 6/2012 | Oliver |
| 9,140,511 B2 | 9/2015 | Michal et al. |
| 9,175,920 B2 | 11/2015 | Moore |
| 9,470,466 B2 | 10/2016 | Washburn, III et al. |
| 9,658,010 B1 | 5/2017 | Oglesby |
| 9,688,048 B2 | 6/2017 | Caps |
| 2003/0096123 A1* | 5/2003 | Yeager ............... C08K 5/103 428/461 |
| 2003/0131922 A1 | 7/2003 | Sing |
| 2007/0034110 A1* | 2/2007 | Zupancich ......... B65D 90/022 220/592.26 |
| 2015/0147514 A1 | 5/2015 | Shinohara et al. |
| 2018/0020975 A1 | 1/2018 | Pohjonen et al. |
| 2018/0292159 A1 | 10/2018 | Thompson et al. |
| 2019/0234684 A1* | 8/2019 | Kabalin ............. B65D 81/389 |
| 2021/0010629 A1* | 1/2021 | Pierce ................ B32B 27/10 |
| 2022/0049045 A1* | 2/2022 | Mennecke ........... C08G 18/10 |

FOREIGN PATENT DOCUMENTS

| | | |
|---|---|---|
| DE | 102011002250 A1 | 10/2011 |
| EP | 2333179 A1 | 6/2011 |
| KR | 1020100119939 A * | 10/2010 ............ B32B 15/08 |
| KR | 101279000 B1 | 7/2013 |
| WO | 2011092679 A2 | 8/2011 |

OTHER PUBLICATIONS

Echemi, "What are the Unique Structure and Properties of Fumed Silica?" 2021, p. 1-3.*

BAUTEX Systems, "Best Practices for Continuous Insulation in Exterior Walls", Building Science, 4 pages, [retrieved Mar. 13, 2019] Retrieved from the internet [URL: https://www.bautexsystems.com/blog/best-practices-for-continuous-insulation-in-exterior-walls].

EPS Industry Alliance, "ASHRAE 90.1 Prescriptive Wall Insulation Requirements", Technical Bulletin, Sep. 2013, 2 pages.

Mandal J., et al., "Hierarchically Porous Polymer Coatings for Highly Efficient Passive Daytime Radiative Cooling," Science, Oct. 2018, vol. 362 (6412), pp. 315-319.

Google Patent Printout of IE86810B1, which is an English version of PCT Patent Publication No. 2011092679.

* cited by examiner

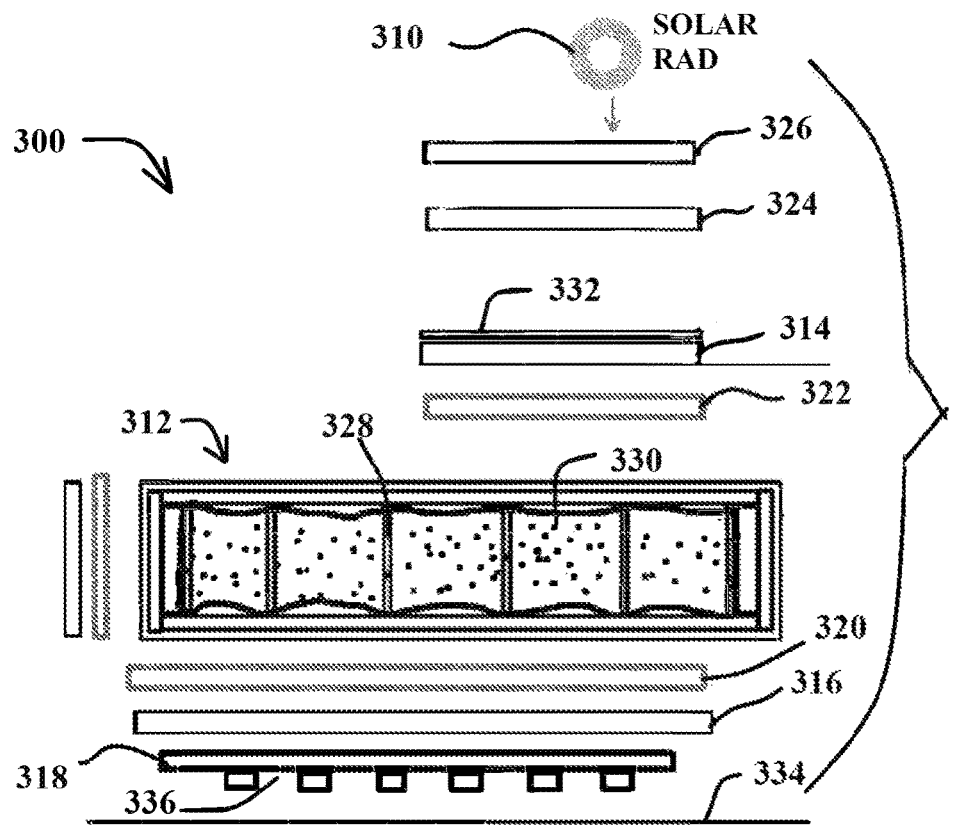
FIG. 6
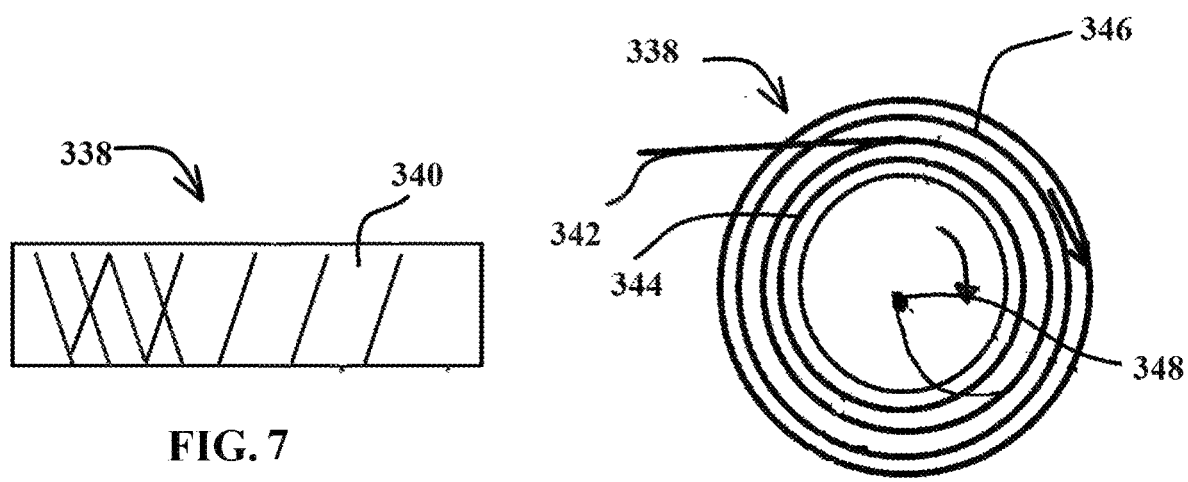
FIG. 7
FIG. 8

600

```
┌─────────────────────────────────────────────────────┐
│ SURROUND A PLURALITY OF RIBS WITH A FIRST           │─ 601
│ SEALING LAYER TO FORM A FIRST SLEEVE                │
└─────────────────────────────────────────────────────┘
                          │
┌─────────────────────────────────────────────────────┐
│ PLACE A PAIR OF SUPPORTING LAYERS ON OPPOSITE       │─ 602
│ SIDES OF THE FIRST SLEEVE                           │
└─────────────────────────────────────────────────────┘
                          │
┌─────────────────────────────────────────────────────┐
│ SURROUND THE PAIR OF SUPPORTING LAYERS WITH A       │─ 603
│ SECOND SEALING LAYER TO FORM A SECOND SLEEVE        │
└─────────────────────────────────────────────────────┘
                          │
┌─────────────────────────────────────────────────────┐
│ FORM A PAIR OF INSULATING OUTER LAYERS ON           │
│ OPPOSITE SIDES OF THE SECOND SLEEVE WITH A          │
│ COMPOSITE ASSEMBLY HAVING NON-METALLIC FIBERS       │─ 604
│ AND A THERMAL INSULATING MATERIAL MATRIX            │
└─────────────────────────────────────────────────────┘
```

FIG. 13

STRUCTURAL INSULATED PANEL

CROSS REFERENCE TO RELATED APPLICATION

This application claims the benefit under 35 U.S.C. § 119(e) of U.S. Provisional Application No. 63/089,565 entitled "STRUCTURAL INSULATED PANEL" filed Oct. 9, 2020, which is incorporated herein by reference.

BACKGROUND

Energy-saving measures have been actively promoted to reduce the effect of excess heat on the global environment. Thermal insulation panels represent one type of energy-saving measure that has been widely employed for the purpose of providing a house, a building and so on with high thermal insulation, providing an automobile door or roof with thermal shield, and employing thermal insulation to reduce the energy required for heating and cooling.

Conventional thermal insulation panels include foamed products, such as urethane foams, have been known. In order to obtain a sufficient thermal insulating property by such foamed products, it is, however, necessary to make the thickness of the foamed products relatively greater. For this reason, when a space for filling a thermal insulation panel is limited, it is impossible to provide a sufficient thermal insulating property. Other types of thermal insulation panels include powder materials, such as perlite or silica, or a fiber material, such as glass fiber, that is decompressed and encapsulated in an outer sheath have been known.

Some thermal insulation elements include a pressure-resistant, open-pore core having low thermal conductivity, as well as a completely enclosed covering made of a film, preferably a plastic film, which has a high barrier effect against gases and water vapor. The core is evacuated, generally to a gas pressure between 0.01 mbar and 5 mbar. As a result, the thermal conductivity of the residual gas within the porous core is reduced to a minimum. Common core materials include powders, open-pore foams, glass fibers, or aerogels. Foams, glass fibers, or powders are usually present in the form of a panel which is cut to the desired size, enclosed with a high-barrier film, and pumped free of air in a vacuum chamber.

Depending on the core material, the thermal conductivity in the evacuated state is between 0.0015 and 0.010 W/mK. However, there is a need to further reduce the thermal conductivity and the thermal resistance of conventional thermal insulation panels. Accordingly, there is a need for an improved thermal insulation panel.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a structural insulated panel includes a pair of insulating outer layers, a pair of rigid supporting inner layers, and a pair of flexible sealing layers. A bridging element is positioned between the rigid inner layers. The bridging element includes a plurality of spaced-apart ribs supporting the rigid inner layers in a spaced-apart overlying relationship with one of the flexible sealing layers surrounding the plurality of spaced-apart ribs forming a first sleeve therearound and the other flexible sealing layer surrounding the supporting inner layers forming a second sleeve therearound. The pair of insulating outer layers includes a composite assembly formed from non-metallic fibers and a thermal insulating material matrix.

In other implementations, a method for assembling a structural insulated panel is provided. A plurality of ribs is surrounded with a first sealing layer to form a first sleeve. A pair of supporting layers is placed on opposite sides of the first sleeve. The pair of supporting layers is surrounded with a second sealing layer to form a second sleeve. A pair of insulating outer layers is formed on opposite sides of the second sleeve with a composite assembly having non-metallic fibers and a thermal insulating material matrix.

In yet other implementations, a structural insulated panel includes a pair of insulating outer layers having non-metallic fibers and a thermal insulating material matrix therein. A bridging element assembly is formed from a pair of supporting substrates separated by a first sealed flexible sleeve having a plurality of spaced-apart ribs therein and a second sealed flexible sleeve surrounding the pair of supporting substrates.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 6 is an exploded schematic view of another embodiment of a structural insulated panel in accordance with this disclosure.

FIG. 7 is a top view of a mold for making compression-resistant ribs in accordance with this disclosure.

FIG. 8 is a side view of the mold shown in FIG. 7.

FIG. 13 illustrate a process in accordance with this disclosure.

DETAILED DESCRIPTION

The subject disclosure is directed to new and improved structural insulated panel. The structural insulated panel includes an internal bridging element assembly that includes a pair of rigid, structural layers that are separated by a plurality of ribs. The ribs are enclosed in a sealed sleeve that can be subject to a vacuum to enhance the insulating properties of the bridging element. A second sealed sleeve encloses the pair of structural layers. A pair of insulating layers that are formed from a basalt fiber composite material provides additional insulating properties. The structural insulated panel can be utilized in roofing applications, flooring, and drywall applications.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
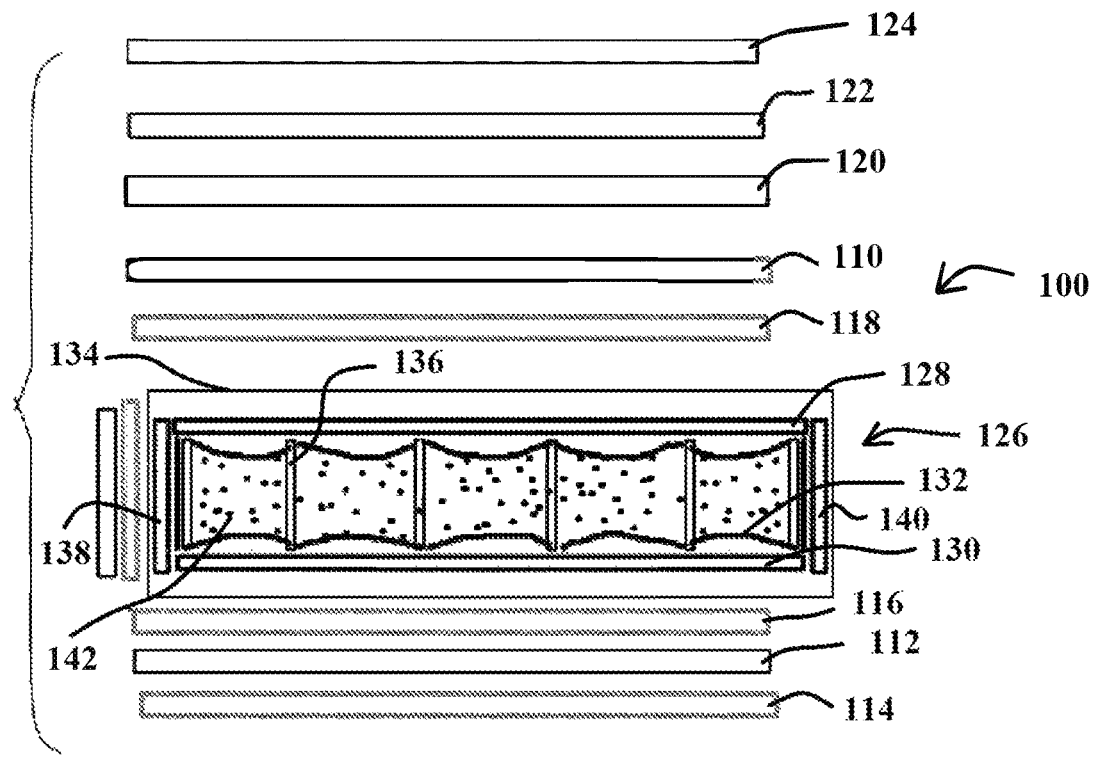
FIG. 1 is an exploded schematic view of a structural insulated panel in accordance with this disclosure.
Figures 2, 3:
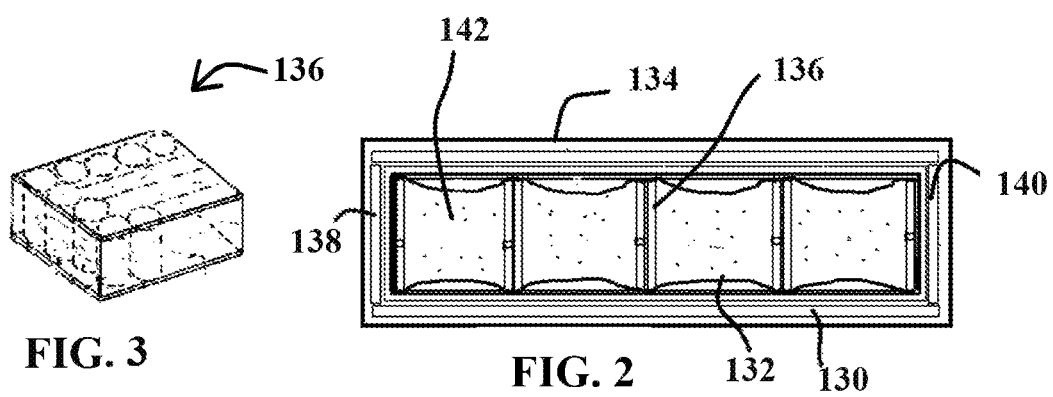
FIG. 2 is a schematic diagram of a bridging element assembly in accordance with this disclosure.
FIG. 3 is a perspective view of a sandwich construction building material structure in accordance with this disclosure.

Referring to drawings and, in particular, to FIGS. 1-3, a structural insulated panel, generally designated by the numeral 100, is shown. The structural insulated panel 100 can be used in roofing applications. The structural insulated panel 100 includes a plurality of outer layers 110-124 and a bridging element assembly 126. In such roofing applications, the layer 114 faces the interior of a structure (not shown) that is covered by the roof. The layer 124 faces the exterior of the structure.

The bridging element assembly 126 includes a pair of rigid, supporting layers 128-130, a pair of flexible sealing layers 132-134, and a plurality of spaced-apart ribs 136 that separate the rigid, supporting layers 128-130 from one another. In some embodiments, the supporting layers 128-130 are connected by a pair of connecting members 138-140 via conventional connecting techniques, such as heat welding or adhesives. In other embodiments, the supporting layers 128-130 and/or the connecting members 138-140 are reinforced with plywood, metal, or composites, including magnesium oxide composites. The ribs 136 can be formed from plywood, metal, or composites, as well.

The ribs 136 support the supporting layers 128-130 in a spaced-apart overlying relationship with the sealing layer 132. The sealing layer 132 surrounds the ribs 136 to form a first sealed sleeve that encloses therearound. The sealing layer 134 surrounds the supporting layers 128-130 to form a second sealed sleeve that encloses therearound.

The sleeves can be evacuated or vacuumed out to remove air that is enclosed therein to enhance the thermal insulating properties of the bridging element assembly 126. In some embodiments, the sleeves can enclose a plurality of insulating particles 142 to further increase the thermal insulating properties of the bridging element assembly 126. The evacuation of the sleeves can create a thermal wall bridging effect and provides the structural insulated panel 100 with a double vacuum seal and/or an inner and outer seal.

The outer layers 110-112 are insulating layers that are made from non-combustible composite materials. In this exemplary embodiment, the outer layers 110-112 can include a composite assembly formed from non-metallic fibers and a thermal insulating material matrix. The non-metallic fibers include basalt fibers that can be formed into a woven fabric.

In some embodiments, the thermal insulating material matrix can include reinforcing particles. In such embodiments, the thermal insulating material matrix can include between about 1% and about 70% of silica insulating granules, between about 1% and about 70% of silicate ceramic microspheres, and between about 29% and about 98% of insulating elastomeric matrix material.

The outer layers 114-118 are insulating layers that are made from insulating materials and/or insulating composites. In this exemplary embodiment, the outer layers 114-118 include sodium silicates and THERMA-CEL® pipe insulation material. THERMA-CEL® is a registered trademark owned by Armacell Enterprise Gmbh & Co. of Waltersdorf, Germany.

The outer layer 120 can form an insulating coating. In this exemplary embodiment, the outer layer 120 includes an aluminum and/or ceramic composite material with an elastomeric matrix.

The outer layer 122 can form an insulating layer. In this exemplary embodiment, the outer layer 122 includes a composite material formed from an acrylic elastomeric material reinforced with silica or opacified aerogel materials.

The outer layer 124 can form an insulating coating. In this exemplary embodiment, the outer layer 124 includes silicone material or an acrylic/urethane elastomeric material. In some embodiments, the outer layer 124 can include passive daytime radiative cooling (PDRC) coating materials formed from hierarchically porous poly (vinylidene fluoride-co-hexafluoropropene) [P(VdF-HFP)HP] coatings with excellent PDRC capability.

Referring now to FIG. 1, the thermal insulating material within the outer layers 110-112 is similar to the thermal insulating material that is disclosed in U.S. patent application Ser. No. 16/850,055, entitled "Thermal Insulating Material", filed Apr. 16, 2020, which is incorporated herein by reference. The thermal insulating material includes at least three components. One of the components can be a thermal insulating nanomaterial in the form of silica insulating granules, which can be made from pyrogenic silica, opacified silica, and/or silica aerogels.

The second component can be a thermal insulating nanomaterial in the form of silicate ceramic microspheres, which can be sodium potassium aluminum silicate microspheres.

The third component can be an insulating elastomeric matrix material, which can include water-based sodium silicate adhesive paste, water-based acrylic aluminum ceramic emulsion coating, water-based acrylic elastic elastomeric coating, water-based acrylic coating, and/or polyurethane. The insulating elastomeric matrix material can be provided as a liquid precursor that cures or hardens into a solid matrix.

The composition can be formed by mixing between about 1% and about 70% of silica insulating granules, between about 1% and about 70% of silicate ceramic microspheres, and between about 29% and about 98% of insulating elastomeric matrix material. In some embodiments, the composition only includes between about 10% and 70% silica insulating granules. In other embodiments, the composition only includes between about 10% and 70% silicate ceramic microspheres. In yet other embodiments, the composition only includes between about 25% and 45% silica insulating granules. In yet other embodiments, the composition only includes between about 25% and 45% silicate ceramic microspheres. In yet other embodiments, the composition includes about 33.3% silica insulating granules, 33.3% silicate ceramic microspheres, and about 33.3% insulating elastomeric matrix material The proportion of each component can be varied in accordance with the above ranges. The use of a higher content of pyrogenic/opacified silica insulating granules (i.e., up to about 70%) can result in a rougher, more uneven surface finished if wet doped. However, such mixtures will yield higher thermal insulation properties and provide the highest temperature resistance for the composition, including up to 1850° F. continuous temperature for fire resistance. Such pyrogenic/opacified silica insulating granules can be nano-sized particles having diameters that range from about 1 nm to about 20 nm.

The use of higher percentages of silica aerogels (i.e., up to about 70%) can reduce the weight of the compositions, as compared to compositions that include pyrogenic/opacified silica particles that can be used at temperatures of up to 1850° F. Such compositions can reduce the thermal insulation ability (i.e., higher thermal conductivity at higher temperatures). Pyrogenic/opacified silica particles can be used in compositions that are likely to be exposed to temperatures that are higher than 1200° F.

In exemplary applications that require smoother finishes, silica aerogel particle sizes can be varied from "fine" to "medium" to "course" before mixing or wet doping. Larger, course aerogel particles produce rougher surfaces, but can provide a higher density of insulating particles to adhesive/binder ratio. Smaller, medium or fine particles provide smoother finishes. In some instances, fine particles will produce mirror-like finishes.

The use of a higher content of silicate ceramic microspheres (i.e., up to 70%) will provide a smoother finish than in compositions that use a high content of silica insulating granules. Such compositions still tend to feel rough to the touch. Additionally, the composition can be utilized in thick applications and, when formed through wet doping, can form a thicker, insulated adhesive with mortar like paste consistency suitable for forming shapes using plastic molds and non-stick shaping tools.

Pyrogenic silica or fumed silica can be produced through any suitable process, such as in a flame to form nanoscale droplets of amorphous silica fused into branched, chainlike, three-dimensional secondary particles which then agglomerate into tertiary particles. The granules can be a microporous opacified blend of pyrogenic silica in a loose granular micro powder state. In some embodiments, particles can be used in an amorphous state and include mixed up particle sizes ranging from micro powder size particles up to 0.125 inches in average diameter all mixed together. In other embodiments, the particles can be FREEFLOW® particles that range from 100 nm to 1 nm in diameter. FREEFLOW® is a registered trademark of Promat Research and Technology Centre NV of Tisselt, Belgium.

In some instances, the silica insulating granules include opacified silica granules. Such suitable granules include high temperature MICROTHERM® granules, which are a pourable microporous insulation with flow characteristics that are suitable the filling of closed objects of complex shape Such granules for high temperature provide microporous insulation performance for applications where conventional insulation products are not suitable. MICROTHERM® is a registered trademark of Promat Research and Technology Centre NV of Tisselt, Belgium. The particles can range from 100 nm to 1 nm in diameter.

In other instances, the silica insulating granules include silica aerogel granules. Such granules can silica-based granules that are derived from silica gel or by a modified Stober process. The silica solidifies into three-dimensional, intertwined clusters that make up only 3% of the volume. Conduction through the solid is therefore very low. The remaining 97% of the volume is composed of air in extremely small nanopores. The particles can be ENOVA® particles that range from 100 nm to 1 nm in diameter. ENOVA® is a registered trademark of Cabot Corporation of Boston, Massachusetts.

Suitable silicate ceramic microspheres include ceramic microsphere granules, such as sodium potassium aluminum silicate microspheres. Exemplary silicate ceramic microspheres include hollow vacuum ceramic microspheres, such as clay mixture CAS 66402-68-4. Such microspheres can include Hy-Tech THERMACELS™ ceramic hollow vacuum microspheres. THERMACELS™ is a trademark by Hy-Tech Thermal Solutions, LLC of Melbourne, Florida.

Suitable elastomeric matrix material includes water-based sodium silicate adhesive paste, water-based acrylic aluminum ceramic emulsion coating, water-based acrylic elastic elastomeric coating, water-based acrylic coating, polyurethane, and/or two-part epoxy resins. Water-based sodium silicate adhesive paste can include an aqueous mixture of sodium silicate with other inorganic components. An exemplary sodium silicate adhesive paste is PROMAT C-1000 Paste from Promat Research and Technology Centre NV of Tisselt, Belgium.

Water-based sodium silicate adhesive paste is non-combustible and does not emit smoke when the maximum performance temperature is exceeded. A typical composition of the paste includes about 35% silicon dioxide, about 0.25% $Fe_2O_3$, about 0.02% CaO, about 6.7% $Na_2O$, about 8.4% $Al_2O_3$, about 0.2% MgO, about 0.3% $K_2O$, and the balance water.

Suitable water-based acrylic aluminum ceramic emulsion coating includes aluminum/ceramic acrylic emulsion coatings that function as a radiant heat barrier coating. Such coatings provide radiant heat reflection and serve as barriers in the coatings systems and on top of cured coatings and insulation materials. Additionally, such coatings can distribute infrared heat radiation across a surface to reduce hot spots in thermal signature reduction coating applications. An exemplary coating is an insulating radiant barrier paint made of ground metallic aluminum pigment blended into an acrylic polymer vehicle and reinforced with insulating ceramics, such BARRIER COAT #85 by Hy-Tech Thermal Solutions LLC of Melbourne, Florida.

Exemplary water-based acrylic elastic elastomeric coatings can function as thermal insulation coating with ceramic microspheres. Such coatings can include an acrylic elastomeric coating blended with low thermal conducting pigments and resins that can be reinforced with insulating ceramics. Such coatings can comprise a waterborne, high build formula that can be applied five times thicker than regular coatings to provide an insulating, soundproof coated surface. An exemplary coating can include RC #233 by Hy-Tech Thermal Solutions LLC of Melbourne, Florida.

Other suitable water-based acrylic coatings include water-based acrylic coatings with pigments, dyes, and colorants. Such coatings can include titanium dioxide and/or carbon black.

Suitable polyurethane coatings include chemical resistant mil-spec polyurethane coatings. Such coatings include polyurethane coatings that are modified with numerous pigments that are designed to absorb different spectrums of light making it more difficult to detect equipment that has been coated with it. Such coatings have chemical resistant that is primarily chemical resistance to DS-2 fluid that is used in decontamination operations.

Some disclosed compositions can meet the Class A or Class C fire exposure ratings/fire resistance requirements of National Fire Protection Association 285 (NFPA 285) at temperatures that exceed 1200° F. continuous or intermittent exposure protection. In such embodiments, inner core insulating nanomaterials should include granular opacified/pyrogenic silica, which is non-combustible and capable of exposure to sustained temperature of up to 1850° F.

The disclosed compositions can form intumescent mixtures that meet NFPA 285 fire codes for a four-hour fire resistance rating. Such compositions can be formed as a layered composition with a mixture of 80% granular opacified/pyrogenic silica and 20% ceramic microspheres in a first layer and a mixture of 50% sodium silica liquid paste and 50% granular opacified/pyrogenic silica in a second layer. The layers can be applied as coatings having thicknesses that do not exceed ³⁄₁₆ inches.

The sealing layers 132-134 are formed from plastic films that enclose the bridging element assembly 126 form evacuated pockets. In some embodiments, the evacuated pockets formed within sealing layers 132 have a pressure of about 5 psi. In some embodiments, the plastic film can be an aluminized MYLAR® film. MYLAR® is a registered trademark of E. I. du Pont de Nemours and Company of Wilmington, Delaware.

Referring now to FIG. 3, the ribs 136 can be formed from honeycomb cells. The honeycomb cells can include sandwich construction building material. In this exemplary embodiment, the sandwich construction building material is similar to the sandwich construction building material disclosed in U.S. Pat. No. 5,738,924, issued on Apr. 14, 1998, entitled "Sandwich Construction Building Materials", which is incorporated herein by reference.

Figure 4:
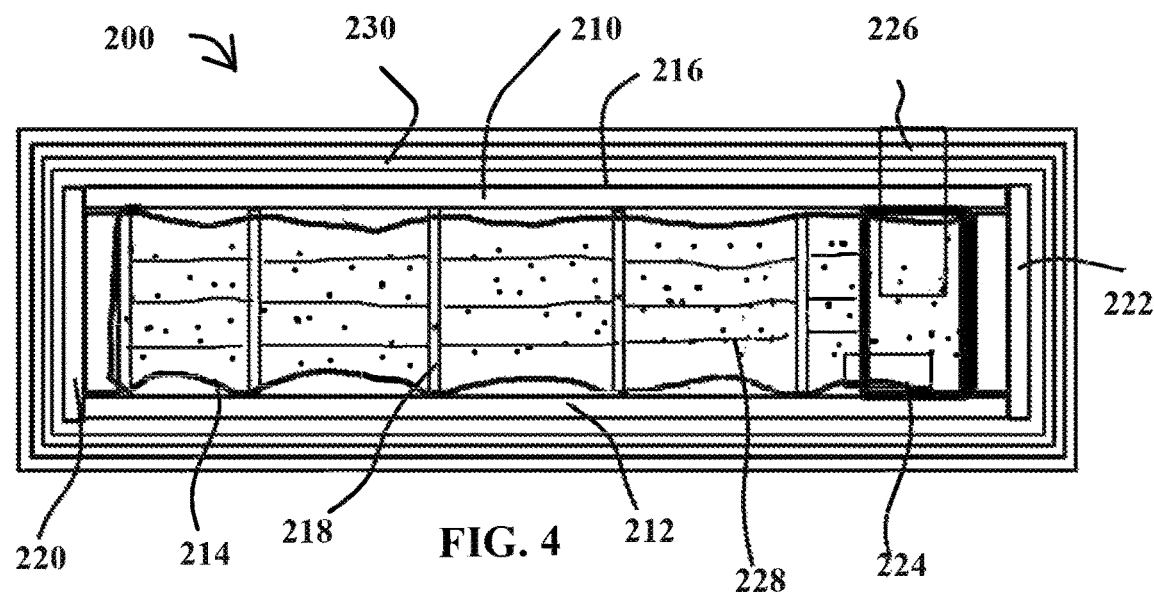
FIG. 4 is a schematic diagram of another embodiment of a bridging element assembly with a check valve incorporated therein in accordance with this disclosure.
Figure 5:
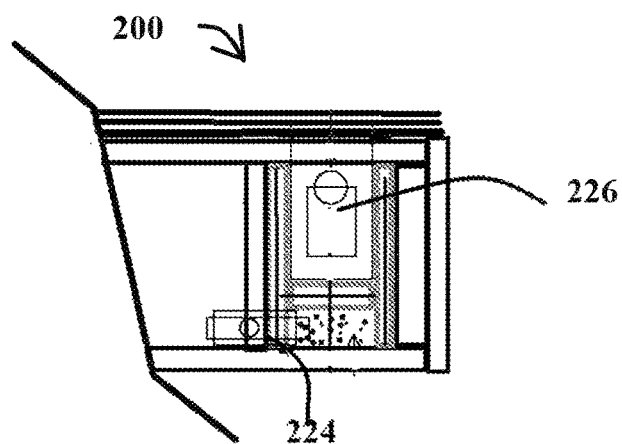
FIG. 5 is a fragmentary schematic diagram of the embodiment of a bridging element assembly with a check valve shown in FIG. 4.

Referring to FIGS. 4-5 with continuing reference to the foregoing figures, another embodiment of a bridging element assembly, generally designated by the numeral 200, is shown. Like the embodiment shown in FIGS. 1-3, the bridging element assembly 200 includes a pair of rigid, supporting layers 210-212, a pair of flexible sealing layers 214-216, a plurality of spaced-apart ribs 218 that separate the rigid, supporting layers 210-212 from one another, and a pair of connecting members 220-222.

Unlike the embodiment shown in FIGS. 1-3, the bridging element assembly 200 includes a pair of check valves 224-226. Each of the check valves 224-226 can be a cartridge check valve, a fluidic check valve, a clack valve, a non-return valve, a reflux valve, a retention valve or a one-way valve is a valve. The check valves 224-226 can allow air to flow through it in only one direction. In this exemplary embodiment, the check valves 224-226 are way round cartridge check ball valves with a TEFLON® seal. TEFLON® is a registered trademark of E. I. du Pont de Nemours and Company of Wilmington, Delaware. In other embodiments, the check valves 224-226 can be surrounded by basalt chopped fiber reinforced sodium silicate and adhesive paste.

The bridging element assembly 200 can include one or more radiant barriers 228 to further enhance the insulating properties. The radiant barriers can be arranged in a loose layout within the interior of the bridging element assembly 200 interior. The radiant barriers 228 can be made from aluminum and polypropylene materials. In some embodiments, the bridging element assembly 200 can be surrounded by an insulating shell 230 formed from insulating composite material layers and metal/plastic film layers to further increase the thermal insulation properties.

Referring to FIGS. 6-8 with continuing reference to the foregoing figures, another embodiment of a structural insulated panel, generally designated by the numeral 300, is shown. The structural insulated panel 300 is a particularly adapted to provide additional protection from heat that is transferred from a radiation source 310. Like the embodiment shown in FIGS. 1-3, the structural insulated panel 300 includes a bridging element assembly 312 and outer layers 314-326.

The outer layers 314-316 are insulating layers that include composite assemblies that are formed from non-metallic fibers and a thermal insulating material matrix that are similar to outer layers 110-112 shown in FIGS. 1-3. The outer layers 318-322 are insulating layers that are made from insulating materials and/or insulating composites that are similar to outer layers 114-118 shown in FIGS. 1-3. The outer layer 324 can form an insulating layer that is similar to outer layer 122 shown in FIGS. 1-3. The outer layer 326 can form an insulating coating that is similar to outer layer 124 shown in FIGS. 1-3.

Unlike the embodiments shown in FIGS. 1-5, the bridging element assembly 312 includes a plurality of ribs 328 that are formed from basalt composites and a plurality of opacified silica powder particles 330. In this exemplary embodiment, the ribs 328 are reinforcing structures made from basalt composites that are formed into various compression resistant shapes. The ribs 328 can form cells made from sodium silicate glue within the bridging element assembly 312. The opacified silica powder particles 330 are packed and compressed under a vacuum chamber.

The structural insulated panel 300 includes additional radiation barrier 332 or radiant barriers 334. The radiant barrier 332 can be a sheet of aluminum that is adhered to the insulating layer 314. The radiant barrier 334 can be placed outside of outer layer 318, and be made from aluminum and/or aluminum coated plastic film in bottom of an air gap. The radiant barrier 334 can act a barrier to moisture, vapor, and air.

The outer layer 318 includes a plurality of air channels 336 that provide for the ventilation of a roof deck (not shown) and the in situ use of a venturi effect roof system that uses the venture effect to draw in loose roof systems.

As shown in FIGS. 7-8, the ribs 328 can be formed from a mold 338. The mold 338 can include a rod 340 that forms a non-stick mold. The rod 340 can be a non-stick plastic, such as TEFLON® and/or UHMW polyethylene, that can be formed into various shapes, such as cylindrical, oval, hexagonal or any other suitable shape. The ribs 328 can be formed from basalt fiber fabric 342 and alternating layers of non-stick plastic 344 and adhesive 346.

The rod 340 can include a notch 348 on an end for locking the fabric 342 thereon. Tension can be applied to the fabric 342 as it is rolled into the mold 338. The fabric 342 can be crimped with a metal member (not shown) to allow it to be locked in place within the tube notch 348. The fabric 342 can be kept under tension with respect to the mold 338 until the adhesive 346 is cured, so that the ribs 328 is pre-tensioned.

In some embodiments, additional layers (not shown) can be added. These additional layers can be applied and rolled at different angles to produce multiaxial (e.g., biaxial or triaxial) resistance. In such embodiments, tension and compression forces can be applied. Once the ribs 328 have been cured, the ribs 328 can be pulled off the rod 340 having a tubular configuration.

Figure 9:
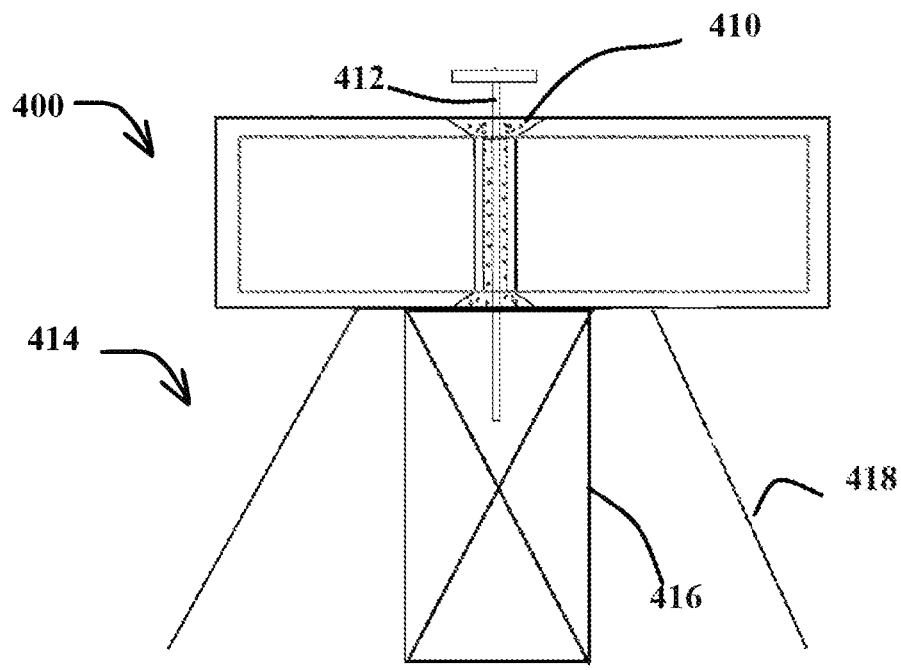
FIG. 9 is a schematic diagram of a fastener cell connected to roof structure in accordance with this disclosure.
Figure 10:
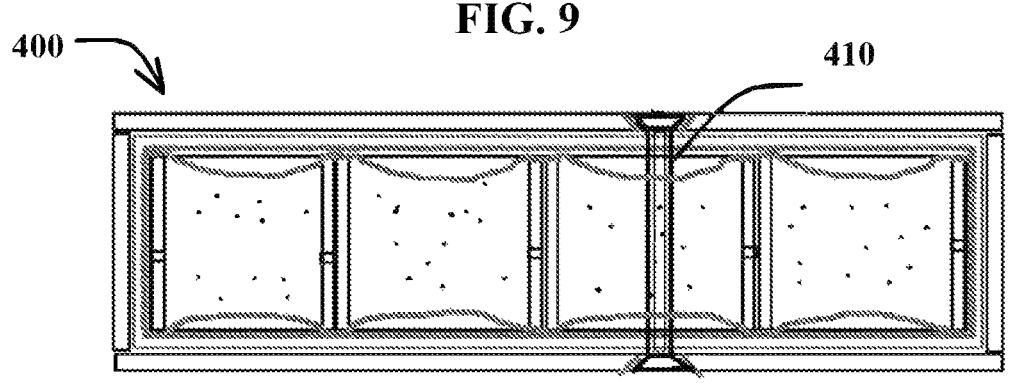
FIG. 10 is a schematic diagram of a side view of the fastener cell shown in FIG. 9.
Figure 11:
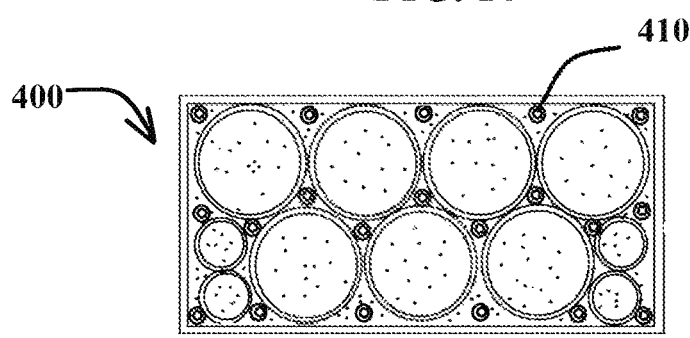
FIG. 11 is a schematic diagram of a top view of the fastener cell shown in FIG. 9.

Referring to FIGS. 9-11 with continuing reference to the foregoing figures, another embodiment of a structural insulated panel, generally designated by the numeral 400, is shown. The structural insulated panel 400 includes a plurality of fastener cells 410 that can accommodate a fastener 412 to connect the structural insulated panel 400 to a structural support assembly 414 that includes a structural support 416 and a corrugated roofing structure 418. The structural support 416 can be a wall stud, a floor joist, or a roof joist.

The fastener cells 410 can be made from pre-tensioned basalt composite materials and can be filled with an intumescent sodium silicate material. The intumescent sodium silicate material can surround the fastener 412. If fire penetrates one of the fastener cells 410, the intumescent sodium silicate material can swell and bubble up to close the hole, as well as stop heat penetration and fire penetration.

Referring to FIG. 10, at least one fastener cell 410 can extend through the structural insulated panel 400. The fastener cell 410 can be positioned so that it secures the structural insulated panel 400 without interfering with seals around the insulating material within.

Referring to FIG. 10, the fastener cells 410 can be positioned such that does not interfere with the ribs surrounding the insulating material. Depending on the installation location of the structural insulated panel 400, the arrangement of the fastener cells 400 can be customized to maximize attachment efficiency.

Figure 12:
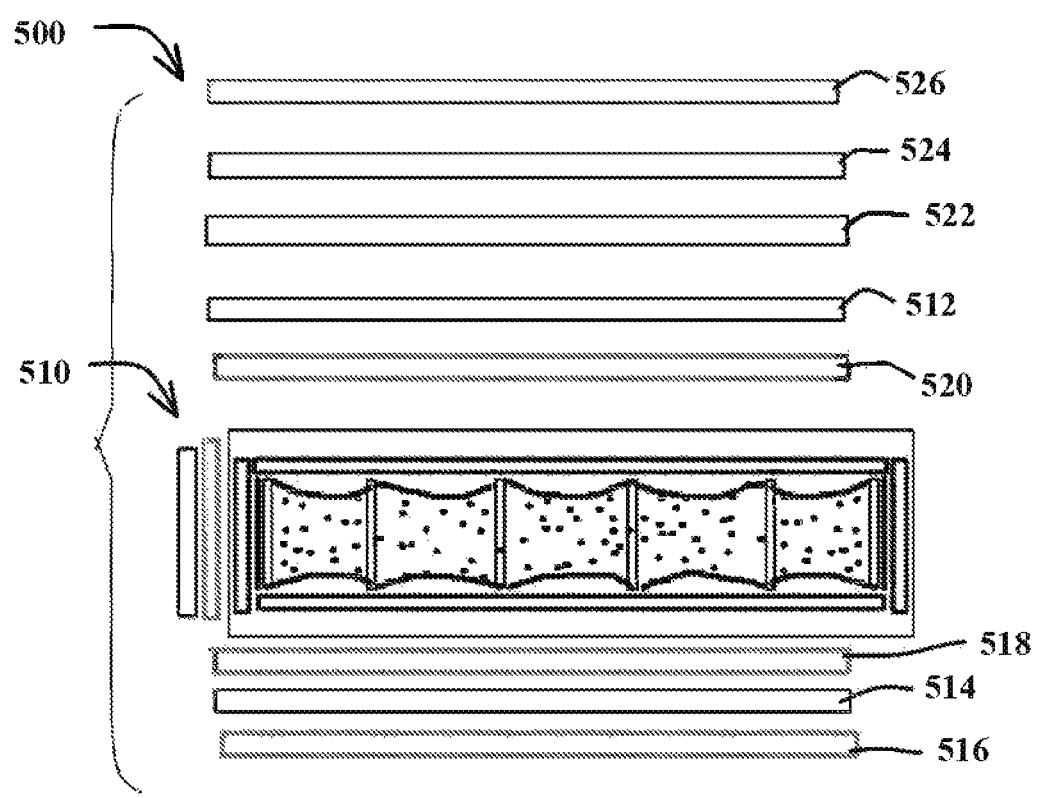
FIG. 12 is a schematic diagram of another embodiment of a structural insulated panel for use in a floor in accordance with this disclosure.
Figure 14:
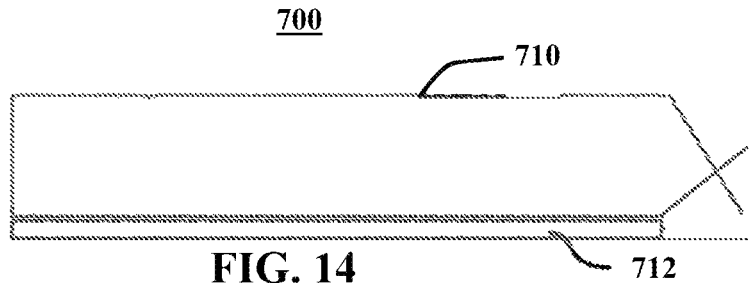
FIGS. 14-18 illustrate a series of steps in a process for assembling a bridging element assembly in accordance with this disclosure.
Figure 15:
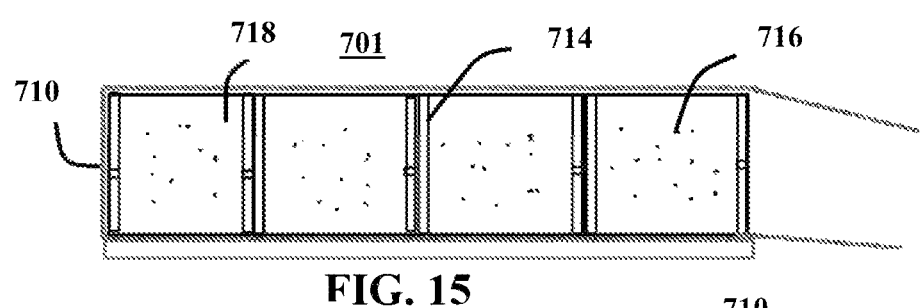
Figure 16:
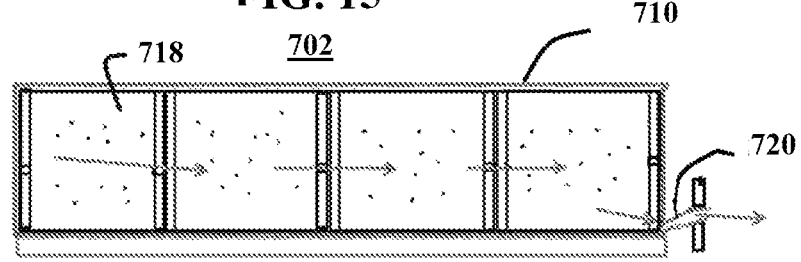
Figure 17:
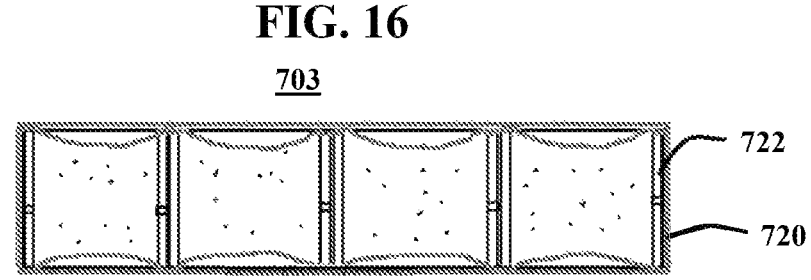
Figure 18:
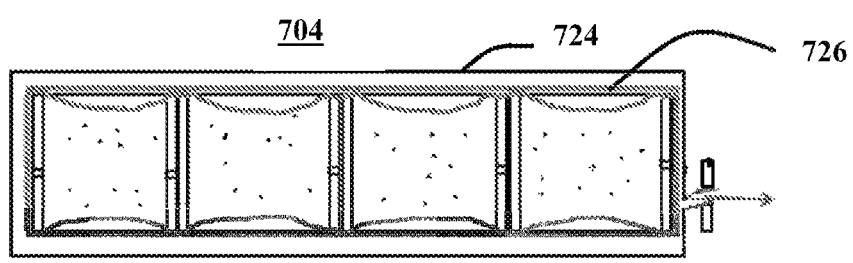

Referring to FIG. 12 with continuing reference to the foregoing figures, another embodiment of a structural insulated panel, generally designated by the numeral 500, is shown. The structural insulated panel 500 is a particularly adapted to insulate a floor. Like the embodiment shown in FIGS. 1-3, the structural insulated panel 500 includes a bridging element assembly 510 and outer layers 512-526.

The outer layers 512-514 are insulating layers that include composite assemblies that are formed from non-metallic fibers and a thermal insulating material matrix that are similar to outer layers 110-112 shown in FIGS. 1-3. The outer layers 516-520 are insulating layers that are made from insulating materials and/or insulating composites that are similar to outer layers 114-118 shown in FIGS. 1-3. The outer layer 522 can form an insulating layer that is similar to outer layer 122 shown in FIGS. 1-3. The outer layer 524 can form an insulating coating that is similar to outer layer 124 shown in FIGS. 1-3. Unlike the embodiments shown in FIGS. 1-11, the outer layer 524 is adjacent to floor coverings 526.

Referring to FIG. 13 with continuing reference to the foregoing figures, a method 600 for assembling a structural insulated panel in accordance with the described subject matter is shown. In this exemplary embodiment, the structural insulated panel can be the structural insulated panel 100 shown in FIGS. 1-3, the structural insulated panel 300 shown in FIGS. 6-8, the structural insulated panel 400 shown in FIGS. 9-11, and/or the structural insulated panel 500 shown in FIG. 12.

At 601, a plurality of ribs is surrounded with a first sealing layer to form a first sleeve. In this exemplary embodiment, the sealing layer can be the sealing layer 132 shown in FIGS. 1-3 and the sealing layer 214 shown in FIGS. 4-5. The ribs can be the ribs 136 shown in FIGS. 1-3, the ribs 218 shown in FIGS. 4-5, and/or the ribs 328 shown in FIGS. 6-8.

At 602, a pair of supporting layers is placed on opposite sides of the first sleeve. In this exemplary embodiment, the supporting layers can be the supporting layers 128-130 shown in FIGS. 1-3 and/or the supporting layers 210-212 shown in FIGS. 4-5.

At 603, the pair of supporting layers is surrounded with a second sealing layer to form a second sleeve. In this exemplary embodiment, the sealing layer can be the sealing layer 134 shown in FIGS. 1-3 and/or the sealing layer 216 shown in FIGS. 4-5.

At 604, a pair of insulating outer layers is formed on opposite sides of the second sleeve with a composite assembly having non-metallic fibers and a thermal insulating material matrix. In this exemplary embodiment, the insulating layers can be the insulating layers 110-112 shown in FIGS. 1-3, the insulating layers 314-316 shown in FIGS. 6-8, and/or the insulating layers 512-514.

Referring to FIG. 14-18 with continuing reference to the foregoing figures, the steps 700-704 for assembling a bridging element assembly in accordance with the described subject matter are shown. In this exemplary embodiment, the bridging element assembly can be the bridging element assembly 126 shown in FIGS. 1-3.

At 700, a flexible film 710 is placed on a rigid support table 712. In this exemplary embodiment, the flexible film 710 can be a seven-layered polyethylene or other thermoplastic film bag with an aluminized coating. The film 710 is ribbed to allow for vacuum evacuation of air. The film 710 is open at one side to allow for the insertion of additional components.

At 701, ribs 714 and insulating particles 716 are inserted therein. The ribs 714 form cells 718 within the flexible film 710. In this exemplary embodiment, the insulating particles 716 are nanoparticles. The ribs can be the ribs 136 shown in FIGS. 1-3, the ribs 218 shown in FIGS. 4-5, and/or the ribs 328 shown in FIGS. 6-8.

At 702, air is evacuated between the cells 718 through perforations in the cell walls. A heat welded seam 720 is formed to seal the film 710. The cells 718 are evacuated to less than about 20 psi.

At 703, the heat welded seam 720 is folded flush against a side panel 722.

At 704, a second layer of flexible film 724 is placed around a partially assembled bridging element assembly 726. The flexible film 724 is evacuated to about 5 psi and sealed.

Various structures that are described above can be reinforced with reinforcement materials. Exemplary metal reinforcement materials include metal structures and alloys.

Suitable structures include tubes, mesh, sheets, tapes, perforated tapes, and other similar structures. Suitable metals include all metals and alloys, such titanium and titanium alloys, aluminum and aluminum alloys, copper and copper alloys, iron and iron alloys, steels, stainless steels, gold and gold alloys, silver and silver alloys, tungsten, brass, and Inconel. Suitable metal structures include tubes, pipe, open mesh woven fabrics, and other suitable configurations, including configurations that need to be insulated from thermal, infrared, and other types of radiation.

Exemplary basalt fiber reinforcement materials include basalt fibers, chopped fibers, and fabrics. Such reinforcement materials are non-combustible and can comprise inert fibers with high tensile strength. Such fibers are inert to most solvents and chemicals that would otherwise break down conventional plastic, synthetic, and organic based fibers.

Basalt fiber reinforcement materials can be made from igneous rock, which provides higher temperature resistance of basalt without using metals. Such fibers have various types, shapes and lengths including threads, woven ropes, woven fabrics, and coated with metals, such as aluminum. Exemplary basalt fibers include SUDAGLASS™ fibers. SUDAGLASS™ is a trademark of Advanced Filament Technologies, LLC of Red Oak, Texas.

Exemplary wood reinforcement materials include hardwoods, softwoods (or conifers), tropical hardwoods. Suitable hardwoods include oak, ash, cherry, maple and poplar. Suitable softwoods include cedar, fir, hemlock, pine, redwood and spruce. Suitable tropical hardwoods include mahogany, rosewood, teak and wenge. Other exemplary wood reinforcement materials include paper, drywall, and pulp.

Exemplary wood reinforcement materials can include laminated or layered materials include various types of engineered wood, such as composite woods, man-made woods, or manufactured boards. Such materials can be formed by binding or fixing the strands, particles, fibres, or veneers or boards of wood, together with adhesives, or other methods of fixation to form composite materials. These materials can be plywood, densified wood, fibreboard, particle board, oriented strand board, laminated timber, and laminated veneer.

Laminated or layered materials can be produced from hardwoods, softwoods, and tropical hardwoods. Laminated or layered materials can include engineered bamboo and similar engineered cellulosic products. Laminated or layered material can be produced from other lignin-containing materials, such as rye straw, wheat straw, rice straw, hemp stalks, kenaf stalks, or sugar cane residue.

Exemplary plastic reinforcement materials include plastic materials, such as thermoplastic olefins (TPOs), polyvinyl chlorides (PVCs), ultra-high molecular weight (UHMW) polyethylene materials, Teflon materials, and polypropylene materials. Exemplary fiber reinforcement materials include KEVLAR® fibers, NOMEX® fibers, carbon fibers, and other similar reinforcing fibers. KEVLAR® and NOMEX® are registered trademarks of E. I. du Pont de Nemours and Company of Wilmington, Delaware. Alternatively, fiberglass, glass, and E-Glass filament woven fabrics and cloths can be used.

The above-described structures can be utilized with continuous insulation systems. Continuous insulation in exterior walls is an essential and required design component of energy efficient and high performing buildings. Continuous insulation as insulation that is uncompressed and continuous across all structural members without thermal bridges and service openings. It is installed on the interior, exterior, or any non-see-through surface of an envelope of a building. The rise in the use of continuous insulation has occurred because of both economic and environmental reasons.

Buildings designed with continuous insulation save money because continuous insulation stops thermal bridging, so that less energy is required for heating and cooling a building. Utilizing continuous insulation can reduce costs associated with mechanical ventilation, heating, and cooling. The use of continuous insulation is good for the environment because less energy consumption means fewer emissions of greenhouse gases, a known cause of global climate change. Continuous insulation is standard practice across all climatic regions of the United States and saves both energy and money.

The use of continuous insulation in exterior walls takes into account the thermal performance, fire, and moisture resistance in the design and construction. In such applications, the amount of insulation that is required, based on the building climate zone, is the amount that eliminates thermal bridging and increases the effective R-value in a wall assembly. Builders, architects, and designers can utilize continuous insulation to create energy efficient, airtight structures that save both money and reduce greenhouse emissions.

Unfortunately, the majority of conventional continuous insulation solutions include combustible materials. This makes it difficult to meet the applicable requirements and codes that govern the installation of conventional continuous insulation system.

Another consideration is moisture. The use of continuous insulation as an additional layer can inhibit the ability of a wall to release trapped moisture from within a wall assembly. The moisture can cause mildew, mold, and rot to develop. Utilizing an air and moisture barrier, along with continuous insulation can, stop thermal convection (i.e., drafts) and thermal conduction. As a result, a pleasant, comfortable environment for the occupants of the building is created Supported Features and Embodiments The detailed description provided above in connection with the appended drawings explicitly describes and supports various features of a structural insulated panel. By way of illustration and not limitation, supported embodiments include a structural insulated panel comprising: a pair of insulating outer layers; a pair of rigid supporting inner layers; a pair of flexible sealing layers; and a bridging element positioned between the rigid inner layers; wherein the bridging element includes a plurality of spaced-apart ribs supporting the rigid inner layers in a spaced-apart overlying relationship with one of the flexible sealing layers surrounding the plurality of spaced-apart ribs forming a first sleeve therearound and the other flexible sealing layer surrounding the supporting inner layers forming a second sleeve therearound; and wherein the pair of insulating outer layers includes a composite assembly formed from non-metallic fibers and a thermal insulating material matrix.

Supported embodiments include the foregoing structural insulated panel, wherein air has been withdraw from the first sleeve and the second sleeve to increase the thermal resistance of the structural insulated panel.

Supported embodiments include any of the foregoing structural insulated panels, wherein the first sleeve includes a check valve.

Supported embodiments include any of the foregoing structural insulated panels, wherein the first sleeve includes a plurality of insulating particles therein.

Supported embodiments include any of the foregoing structural insulated panels, wherein the non-metallic fibers include basalt fibers.

Supported embodiments include any of the foregoing structural insulated panels, further comprising a pair of radiation barriers with each radiation barrier being positioned between one of the pair of insulating outer layers and the second sleeve at least partially.

Supported embodiments include any of the foregoing structural insulated panels, wherein the composite assembly include reinforcing particles within the thermal insulating material matrix.

Supported embodiments include any of the foregoing structural insulated panels, wherein the thermal insulating material matrix includes: between about 1% and about 70% of silica insulating granules, between about 1% and about 70% of silicate ceramic microspheres, and between about 29% and about 98% of insulating elastomeric matrix material.

Supported embodiments include any of the foregoing structural insulated panels, wherein the plurality of spaced-apart ribs include honeycomb cells.

Supported embodiments include any of the foregoing structural insulated panels, wherein the honeycomb cells include sandwich construction building material.

Supported embodiments include any of the foregoing structural insulated panels, wherein the pair of rigid supporting inner layers includes reinforcing materials selected from the group consisting of plywood, metal, and composites.

Supported embodiments include any of the foregoing structural insulated panels, further comprising: a pair of coating layers surrounding the pair of insulating outer layers.

Supported embodiments include any of the foregoing structural insulated panels, wherein the pair of flexible sealing layers includes plastic film.

Supported embodiments include any of the foregoing structural insulated panels, wherein the pair of inner layers includes reinforcing materials selected from the group consisting of plywood, metal, and composites.

Supported embodiments include any of the foregoing structural insulated panels, wherein the pair of connecting members includes reinforcing materials selected from the group consisting of plywood, metal, and composites.

Supported embodiments include any of the foregoing structural insulated panels, further comprising a pair of coating layers surrounding the plurality of insulating outer layers.

Supported embodiments include any of the foregoing structural insulated panels, wherein the pair of flexible sealing layers includes plastic film.

Supported embodiments include any of the foregoing structural insulated panels, further comprising an insulating shell, formed from insulating composite material layers and metal/plastic film layers, surrounding the bridging element assembly to further increase the thermal insulation properties.

Supported embodiments include an apparatus, a system, a method, and/or means for implementing any of the foregoing structural insulated panels or portions thereof.

Supported embodiments include a method for assembling a structural insulated panel comprising: surrounding a plurality of ribs with a first sealing layer to form a first sleeve; placing a pair of supporting layers on opposite sides of the first sleeve; surrounding the pair of supporting layers with a second sealing layer to form a second sleeve; and forming a pair of insulating outer layers on opposite sides of the second sleeve with a composite assembly having non-metallic fibers and a thermal insulating material matrix.

Supported embodiments include the foregoing method, further comprising: withdrawing air from the first sleeve and the second sleeve to increase the thermal resistance of the structural insulated panel.

Supported embodiments include any of the foregoing methods, further comprising: inserting a check valve within the first sleeve.

Supported embodiments include any of the foregoing methods, further comprising: coating the pair of insulating outer layers to increase the thermal resistance of the structural insulated panel.

Supported embodiments include any of the foregoing methods, further comprising: positioning a radiation barrier between one of the pair of insulating outer layers and the second sleeve at least partially.

Supported embodiments include an apparatus, a system, and/or means for implementing any of the foregoing methods or portions thereof.

Supported embodiments include a structural insulated panel comprising: a pair of insulating outer layers having non-metallic fibers and a thermal insulating material matrix therein; and a bridging element assembly formed from a pair of supporting substrates separated by a first sealed flexible sleeve having a plurality of spaced-apart ribs therein and a second sealed flexible sleeve surrounding the pair of supporting substrates.

Supported embodiments include the foregoing structural insulated panel, wherein air has been withdrawn by vacuum from first sealed flexible sleeve and the second sealed flexible sleeve to increase the thermal resistance of the structural insulated panel.

Supported embodiments include an apparatus, a system, a method, and/or means for implementing any of the foregoing structural insulated panels or portions thereof.

Supported embodiments can provide various attendant and/or technical advantages in terms of improved efficiency and/or savings with respect to providing a structural insulated panel with improved thermal conductivity and the thermal resistance. The subject structural insulated panels can be made from fire resistant materials, fireproof materials, recyclable materials, recycled materials, non-toxic materials, waterproof materials, and/or environmentally friendly materials.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A structural insulated panel for a building, comprising:
   a bridging element assembly comprising a pair of rigid supporting layers, each comprising a pair of opposing distal ends and each connected to the other rigid supporting layer at each distal end by a connecting member,
   a plurality of supporting ribs sandwiched between the pair of rigid supporting layers and arranged with a filler space in between each pair of adjacent supporting ribs of the plurality of supporting ribs,
   a plurality of insulating particles within the filler space,
   a first flexible sealing layer enveloping the plurality of supporting ribs to form a first sleeve, wherein air has been withdrawn from within the first sleeve,
   and a second flexible sealing layer enveloping the pair of rigid supporting layers to form a second sleeve, wherein air has been withdrawn from within the second sleeve;
   a first insulating outer layer and a second insulating outer layer sandwiching the bridging element assembly and including sodium silicates;
   a third outer layer and fourth outer layer sandwiching the first and second insulating outer layers and including non-metallic fibers and a thermal insulating material matrix;
   a fifth insulating outer layer, arranged above the third outer layer, including an aluminum composite material with an elastomeric matrix;
   a sixth insulating outer layer, arranged above the fifth insulating outer layer, comprising an acrylic elastomeric material reinforced with silica or opacified aerogel materials; and
   a seventh insulating outer layer, arranged above the sixth insulating outer layer, comprising silicone material.

2. The structural insulated panel of claim 1, wherein air has been withdrawn from within the first sleeve to achieve an internal pressure of about 20 psi to increase the thermal resistance of the structural insulated panel.

3. The structural insulated panel of claim 1, wherein air has been withdrawn from within the second sleeve to achieve an internal pressure of about 5 psi to increase the thermal resistance of the structural insulated panel.

4. The structural insulated panel of claim 1, wherein the first sleeve includes a first check valve, and the second sleeve includes a second check valve.

5. The structural insulated panel of claim 4, wherein the first and second check valves are surrounded by basalt chopped fiber reinforced with sodium silicate and adhesive paste.

6. The structural insulated panel of claim 1, wherein the plurality of insulating particles are nanoparticles.

7. The structural insulated panel of claim 1, further comprising a plurality of radiant barriers, made of aluminum and polypropylene material, arranged in a loose layout between the rigid supporting layers.

8. The structural insulated panel of claim 1, wherein the third and fourth outer insulation layers comprises non-metallic fibers that include basalt fibers.

9. The structural insulated panel of claim 1, wherein the third and fourth outer layers each comprise a composite assembly including reinforcing particles within the thermal insulating material matrix.

10. The structural insulated panel of claim 1, wherein the third outer insulating layer and the fourth outer insulating layer includes a thermal insulating material matrix that includes:
    between about 1% and about 70%, by volume, of silica insulating granules,
    between about 1% and about 70%, by volume, of silicate ceramic microspheres, and
    between about 29% and about 98%, by volume, of insulating elastomeric matrix material.

11. The structural insulated panel of claim 1, wherein the plurality of supporting ribs comprises honeycomb cells.

12. The structural insulated panel of claim 11, wherein the honeycomb cells are constructed with sandwich construction building material.

13. The structural insulated panel of claim 1, wherein the supporting ribs comprises basalt composites and a plurality of opacified powder particles.

14. The structural insulated panel of claim 1, further comprising a plurality of fastener cells that attaches the structural insulated panel to a structural support of the building, wherein the plurality of fastener cells comprises pre-tensioned basalt composite materials and an intumescent sodium silicate material.

* * * * *